(12) United States Patent
Nam et al.

(10) Patent No.: US 12,071,363 B2
(45) Date of Patent: Aug. 27, 2024

(54) GLASS ARTICLE AND DISPLAY DEVICE INCLUDING THE SAME

(71) Applicant: Samsung Display Co., Ltd., Yongin-si (KR)

(72) Inventors: Jin Su Nam, Hwaseong-si (KR); Yongkyu Kang, Hwaseong-si (KR); Jihyun Ko, Suwon-si (KR); Minki Kim, Hwaseong-si (KR); Hyunseung Seo, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/882,039

(22) Filed: Aug. 5, 2022

(65) Prior Publication Data

US 2023/0192533 A1 Jun. 22, 2023

(30) Foreign Application Priority Data

Dec. 21, 2021 (KR) .......... 10-2021-0183571

(51) Int. Cl.
| | |
|---|---|
| *C03C 10/00* | (2006.01) |
| *B32B 7/027* | (2019.01) |
| *B32B 17/06* | (2006.01) |
| *C03B 32/02* | (2006.01) |
| *C03C 21/00* | (2006.01) |

(52) U.S. Cl.
CPC .......... *C03C 10/0027* (2013.01); *B32B 7/027* (2019.01); *B32B 17/06* (2013.01); *C03B 32/02* (2013.01); *C03C 21/002* (2013.01); *B32B 2250/40* (2013.01); *B32B 2307/30* (2013.01); *B32B 2457/20* (2013.01); *C03C 2204/00* (2013.01)

(58) Field of Classification Search
CPC .............. C03C 10/0027; C03C 21/002; C03C 2204/00; B32B 7/027; B32B 17/06; B32B 2250/40; B32B 2307/30; B32B 2457/20; C03B 32/02
See application file for complete search history.

(56) References Cited

U.S. PATENT DOCUMENTS

| | | | |
|---|---|---|---|
| 2017/0144921 A1* | 5/2017 | Beall | C03C 4/02 |
| 2021/0230049 A1* | 7/2021 | Fan | C03C 3/091 |
| 2023/0167020 A1* | 6/2023 | Harris | C03C 10/0027 |
| | | | 361/807 |

FOREIGN PATENT DOCUMENTS

| | | |
|---|---|---|
| KR | 101180200 B1 | 9/2012 |
| KR | 1020160020511 A | 2/2016 |
| KR | 1020160071427 A | 6/2016 |
| KR | 1020170036091 A | 3/2017 |
| KR | 1020180096723 A | 8/2018 |
| KR | 1020190061028 A | 6/2019 |
| KR | 102235722 B1 | 4/2021 |

* cited by examiner

*Primary Examiner* — Alicia J Weydemeyer
*Assistant Examiner* — Laura B Figg
(74) *Attorney, Agent, or Firm* — CANTOR COLBURN LLP (57) ABSTRACT

A glass article includes a central layer including a first crystalline phase having a first coefficient of thermal expansion and a surface layer surrounding an entirety of the central layer and including a second crystalline phase having a second coefficient of thermal expansion smaller than the first coefficient of thermal expansion. Accordingly, the strength of the glass article may be improved.

20 Claims, 6 Drawing Sheets

GLASS ARTICLE AND DISPLAY DEVICE INCLUDING THE SAME

This application claims priority to Korean Patent Application No. 10-2021-0183571, filed on Dec. 21, 2021, and all the benefits accruing therefrom under 35 U.S.C. § 119, the content of which in its entirety is herein incorporated by reference.

BACKGROUND

1. Field

Embodiments provide generally to a glass article. More particularly, embodiments relate to a glass article and a display device including the same.

2. Description of the Related Art

Glass articles are widely used in electronic devices including display devices, building materials, and the like. The glass article is applied to a substrate of a flat panel display device such as a liquid crystal display device ("LCD"), an organic light-emitting display device ("OLED"), an electrophoretic display device ("EPD"), or a cover window for protecting the substrate.

As portable electronic devices such as smartphones and tablet personal computers ("PCs") increase, the glass articles applied thereto are also frequently exposed to external impacts. For portability, a development of the glass article which is thin and has good strength to withstand external impact is desired.

SUMMARY

Strength of a glass article may be improved through thermal strengthening or chemical strengthening, but thermal strengthening may not be implemented in a glass article having a thin thickness.

Embodiment provides a glass article having improved a breakage property.

Embodiment provides a display device including the glass article.

A glass article in embodiments of the invention may include a central layer including a first crystalline phase having a first coefficient of thermal expansion and a surface layer surrounding an entirety of the central layer and including a second crystalline phase having a second coefficient of thermal expansion smaller than the first coefficient of thermal expansion.

In an embodiment, the first crystalline phase of the central layer may include lithium disilicate and the second crystalline phase of the surface layer may include lithium alumino silicate.

In an embodiment, a thickness of the surface layer may be smaller than a thickness of the central layer in a thickness direction perpendicular to a main plane extension direction of the surface layer and the central layer.

In an embodiment, a volume fraction of the first crystalline phase of the central layer and a volume fraction of the second crystalline phase of the surface layer may be equal to each other.

In an embodiment, the second crystalline phase may have the second coefficient of thermal expansion that varies with a measurement location of the surface layer.

In an embodiment, the first coefficient of thermal expansion may be constant. The second coefficient of thermal expansion may gradually increase in a direction from an outer surface of the surface layer toward an outer surface of the central layer.

In an embodiment, a volume fraction of the second crystalline phase of the surface layer may gradually decrease in a direction from an outer surface of the surface layer toward an outer surface of the central layer.

A glass article in embodiments of the invention may include a central layer including a first crystalline phase having a first coefficient of thermal expansion and a surface layer surrounding an entirety of the central layer and including: a first layer including a second crystalline phase having a second coefficient of thermal expansion smaller than the first coefficient of thermal expansion and a second layer including a third crystalline phase having a third coefficient of thermal expansion smaller than the first coefficient of thermal expansion.

In an embodiment, the first crystalline phase may include lithium disilicate and each of the second and third crystalline phases may include lithium alumino silicate.

In an embodiment, a composition ratio of $Li_2O$, $Al_2O_3$, and $SiO_2$ of the lithium alumino silicate in the second crystalline phase may be different from a composition ratio of $Li_2O$, $Al_2O_3$, and $SiO_2$ of the lithium alumino silicate in the third crystalline phase.

In an embodiment, the second coefficient of thermal expansion may be different from the third coefficient of thermal expansion.

In an embodiment, a volume fraction of the first crystalline phase of the central layer and a volume fraction of the second crystalline phase of the surface layer may be equal to each other.

In an embodiment, the first layer and the second layer may be disposed alternately with each other.

In an embodiment, a volume fraction of the second crystalline phase in the first layer may be larger than a volume fraction of the third crystalline phase in the second layer.

In an embodiment, the second coefficient of thermal expansion may be smaller than the third coefficient of thermal expansion.

A display device in embodiments of the invention may include a display panel which displays an image and a glass article including: a central layer including a first crystalline phase having a first coefficient of thermal expansion and a surface layer surrounding an entirety of the central layer and including a second crystalline phase having a second coefficient of thermal expansion smaller than the first coefficient of thermal expansion.

In an embodiment, the first crystalline phase of the central layer may include lithium disilicate and the second crystalline phase of the surface layer may include lithium alumino silicate.

In an embodiment, a thickness of the surface layer may be smaller than a thickness of the central layer.

In an embodiment, a volume fraction of the first crystalline phase of the central layer and a volume fraction of the second crystalline phase of the surface layer may be equal to each other.

In an embodiment, the second crystalline phase may have the second coefficient of thermal expansion that varies with a measurement location of the surface layer.

In a glass article and a display device including the same in an embodiment of the invention, the glass article may include a central layer including a first crystalline phase having a first coefficient of thermal expansion, and a surface layer surrounding an entirety of the central layer and including a second crystalline phase having a second coefficient of thermal expansion smaller than the first coefficient of thermal expansion. Accordingly, the strength of the glass article may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Hereinafter, embodiments of the disclosure will be explained in detail with reference to the accompanying drawings. The same reference numerals are used for the same components in the drawings, and redundant descriptions of the same components will be omitted.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Figure 1:
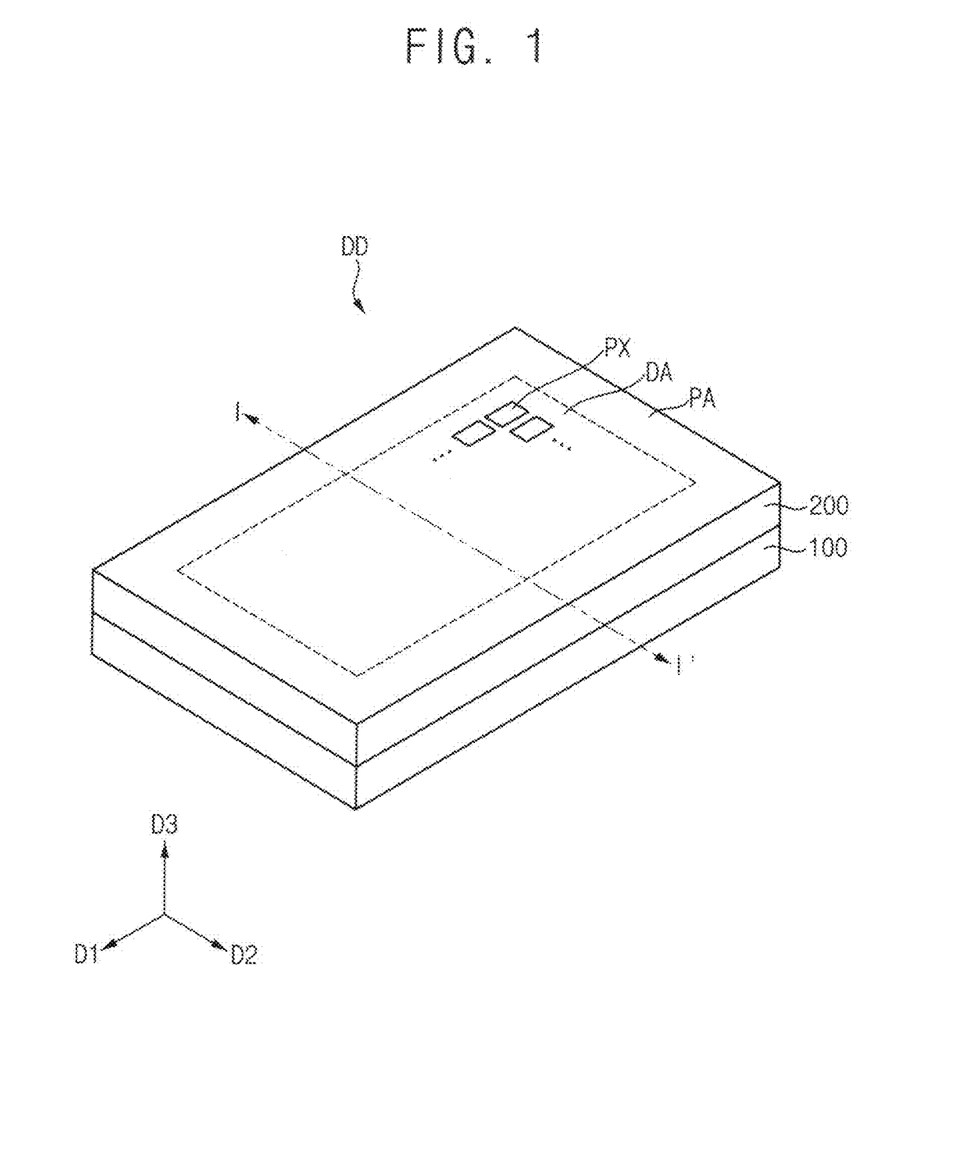
FIG. 1 is a perspective view illustrating an embodiment of a display device including a glass article.

FIG. 1 is a perspective view illustrating an embodiment of a display device including a glass article.

Referring to FIG. 1, the display device DD in an embodiment may include a display panel 100 displaying an image and a glass article 200 disposed on the display panel 100.

The display device DD may be divided into a display area DA and a peripheral area PA disposed adjacent to the display area DA. The peripheral area PA may surround at least a portion of the display area DA. In an embodiment, the peripheral area PA may surround an entirety of the display area DA. The display area DA may be defined as an area capable of displaying an image by generating light or adjusting transmittance of light provided from an external light source. The peripheral area PA may be defined as an area that does not display an image.

A plurality of pixels PX may be arranged in the display area DA. The plurality of pixels PX may generate light according to a driving signal. The plurality of pixels PX may be arranged in a first direction D1 and a second direction D2 crossing the first direction D1. However, the invention is not limited thereto, and plurality of pixels PX may be arranged in various other directions.

The display panel 100 may provide a display screen. In an embodiment, the display panel 100 may include an organic light-emitting display panel, a liquid crystal display panel, an electrophoretic display panel, a plasma display panel, an inorganic light-emitting display panel, or a quantum dot display panel, for example.

The glass article 200 may be disposed on the display panel 100. Specifically, the glass article 200 may be attached to the display panel 100 through an adhesive layer (not shown). In an embodiment, the glass article 200 may be a cover window for a display panel to protect the display panel 100. The cover window for the display panel may protect the display panel 100 from being broken by an external impact. However, the configuration of the invention is not limited thereto, and the glass article 200 may be a configuration used in other devices.

Figure 2:
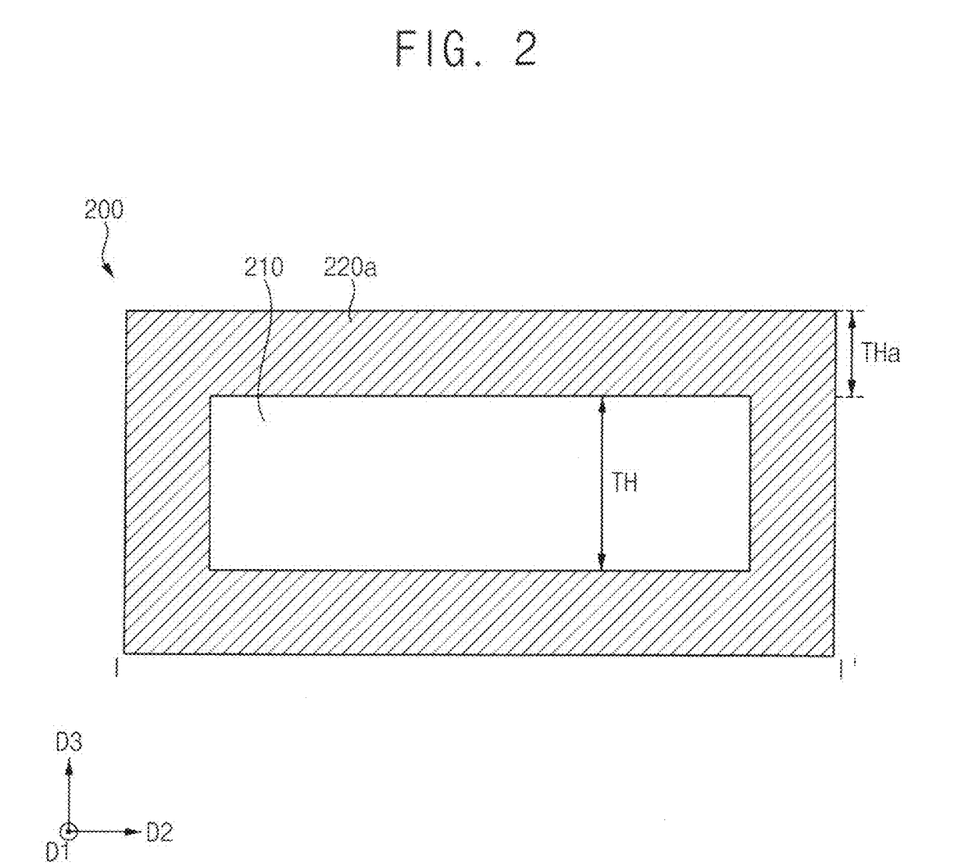
FIG. 2 is a cross-sectional view taken along line I-I' of the glass article of FIG. 1.

FIG. 2 is a cross-sectional view taken along line I-I' of the glass article of FIG. 1.

Referring to FIG. 2, the glass article 200 in an embodiment of the invention may include a central layer 210 and a surface layer 220a surrounding the central layer 210.

In an embodiment, the glass article 200 may be a crystallized glass formed by crystallizing amorphous glass. The crystallized glass may include a crystalline phase and a glass phase. Here, a glass composition of the amorphous glass may be the same as a glass composition of the crystallized glass.

The glass article 200 may include a lithium alumino silicate ("LAS")-based crystallized glass or a sodium alumino silicate ("NAS")-based crystallized glass. In an embodiment, the glass article 200 may include the LAS-based crystallized glass. In an embodiment, the glass article 200 may include silicon dioxide ($SiO_2$), aluminum oxide ($Al_2O_3$), and lithium oxide ($Li_2O$). In this case, the glass article 200 may further include at least one of phosphorus pentoxide ($P_2O_5$), potassium oxide ($K_2O$), magnesium oxide (MgO), calcium oxide (CaO), strontium oxide (SrO), barium oxide (BaO), tin oxide ($SnO_2$) and zirconium oxide ($ZrO_2$). However, the configuration of the invention is not limited thereto, and the glass article 200 may further include other components.

In another embodiment, the glass article 200 may include silicon dioxide ($SiO_2$), aluminum oxide ($Al_2O_3$), lithium oxide ($Li_2O$), and sodium oxide ($Na_2O$). In this case, the glass article 200 may further include at least one of phosphorus pentoxide ($P_2O_5$), potassium oxide ($K_2O$), magnesium oxide (MgO), calcium oxide (CaO), strontium oxide (SrO), barium oxide (BaO), tin oxide (SnO2), and zirconium oxide (ZrO2). However, the configuration of the invention is not limited thereto, and the glass article 200 may further include other components.

Hereinafter, each component included in the glass article 200 will be described.

$SiO_2$ may constitute a skeleton of the glass, improve chemical durability, and reduce an occurrence of cracks when a surface of the glass is scratched. When a content of SiO2 is too large, a coefficient of thermal expansion may be lowered. $SiO_2$ is a constituent component of lithium alumino silicate, which will be described later.

$SiO_2$ may improve the friability of the glass. That is, $Al_2O_3$ may cause a smaller number of fragments to occur when the glass breaks. In addition, $Al_2O_3$ may improve ion exchange performance during chemical strengthening and increase surface compressive stress after chemical strengthening, similarly to or the same as an active ingredient. $Al_2O_3$ is a constituent component of lithium alumino silicate, which will be described later.

$P_2O_5$ may improve ion exchange performance and chipping resistance. In an alternative embodiment, $P_2O_5$ may be omitted.

$Li_2O$ may form the surface compressive stress by ion exchange. $Li_2O$ may be an essential constituent. Li ions disposed near a glass surface may be exchanged with Na ions or the like through an ion exchange process. In addition, $Li_2O$ may further improve a friability of the glass. $Li_2O$ is a constituent component of lithium alumino silicate, which will be described later.

$Na_2O$ may form the surface compressive stress by ion exchange and improving the meltability of glass. Na ions disposed near a glass surface may be exchanged with K ions or the like through an ion exchange process. When a content of $Na_2O$ is too small, the meltability of the glass may be lowered, and the coefficient of thermal expansion may be lowered. When a content of $Na_2O$ is too large, the coefficient of thermal expansion may be high. In an alternative embodiment, $Na_2O$ may be omitted.

$K_2O$ may perform a function which is similar to or the same as that of $Na_2O$. That is, $K_2O$ may form the surface compressive stress by ion exchange and improve the meltability of glass. When a content of $K_2O$ is too high, a coefficient of thermal expansion may be high. In an alternative embodiment, $K_2O$ may be omitted.

MgO may increase the surface compressive stress of a chemically strengthened glass and improve the friability of the glass.

CaO may improve the meltability of the glass and improve the friability of the glass. In an alternative embodiment, CaO may be omitted.

$ZrO_2$ may be a component constituting crystal nuclei during crystallization treatment. $SnO_2$ may also be a component constituting crystal nuclei during the crystallization treatment. In addition, $SnO_2$ may be a component that increases solarization resistance.

SrO may improve the meltability of the glass for chemical strengthening, and may be a component capable of improving the refractive index of the glass.

BaO may improve the meltability of the glass for chemical strengthening, and may be a component capable of improving the refractive index of the glass.

Referring back to FIG. 2, the central layer 210 may include a first crystalline phase having a first coefficient of thermal expansion, and the surface layer 220a may include a second crystalline phase having a second coefficient of thermal expansion different from the first coefficient of thermal expansion. In an embodiment, the second coefficient of thermal expansion may be smaller than the first coefficient of thermal expansion. Accordingly, in the process of manufacturing the glass article 200, the strength of the glass article 200 may be enhanced due to a difference between the first and second coefficients of thermal expansion.

In an embodiment, the first crystalline phase may include lithium disilicate, and the second crystalline phase may include lithium alumino silicate. In an embodiment, the second crystalline phase may include β-spodumene, β-quartz solid solution, or virgilite, for example. However, the configuration of the invention is not limited thereto, and each of the first crystal phase and the second crystal phase may include a different crystal component.

In an embodiment, in a temperature range of about 25 degrees Celsius (° C.) to about 600° C. or about 25° C. to about 700° C., a coefficient of thermal expansion of the lithium disilicate may be about $11 \times 10^{-6}$/° C., and a coefficient of thermal expansion of the lithium alumino silicate may be about 0/° C. to about $2 \times 10^{-6}$/° C., for example.

In an embodiment, a volume fraction of the first crystalline phase of the central layer 210 may be the same as a volume fraction of the second crystalline phase of the surface layer 220a. In another embodiment, the volume fraction of the first crystalline phase of the central layer 210 may be different from the volume fraction of the second crystalline phase of the surface layer 220a. In an embodiment, the volume fraction of the first crystalline phase of the central layer 210 may be larger than the volume fraction of the second crystalline phase of the surface layer 220a, for example. In an alternative embodiment, the volume fraction of the first crystalline phase of the central layer 210 may be smaller than the volume fraction of the second crystalline phase of the surface layer 220a, for example.

A thickness THa of the surface layer 220a may be smaller than a thickness TH of the central layer 210 in the third direction (also referred to as a thickness direction) D3 perpendicular to a plane defined by the first and second directions D1 and D2. In an embodiment, as the volume fraction of the second crystal phase of the surface layer 220a decreases, the thickness of the surface layer 220a may decrease, for example. That is, as the volume fraction of the second crystalline phase of the surface layer 220a decreases, a difference between the thickness of the central layer 210 and the thickness of the surface layer 220a may increase.

In the glass article 200 in an embodiment of the invention, the glass article 200 may include the central layer 210 including the first crystalline phase having the first coefficient of thermal expansion, and the surface layer 220a surrounding an entirety of the central layer 210 and including the second crystalline phase having the second coefficient of thermal expansion smaller than the first coefficient of thermal expansion. Accordingly, a high surface compressive stress may be formed in the surface layer 220a. In addition, a depth of the surface layer 220a may be increased. That is, the strength of the glass article 200 may be improved.

Figure 3:
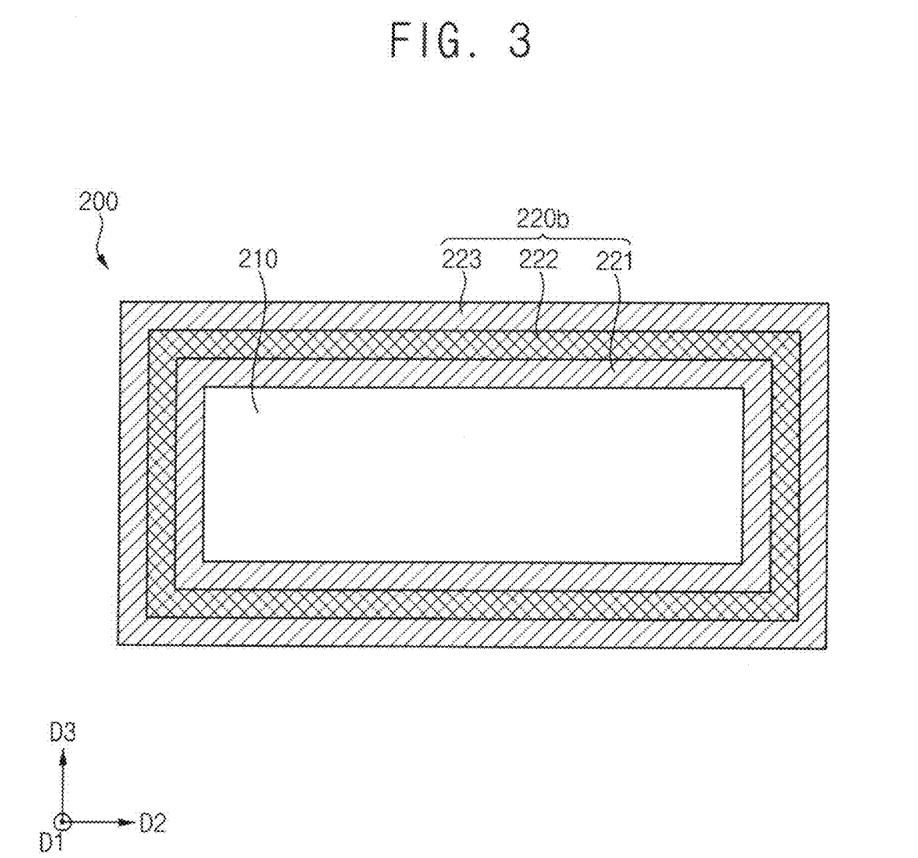
FIG. 3 is a cross-sectional view illustrating another embodiment of a glass article.
Figure 4:
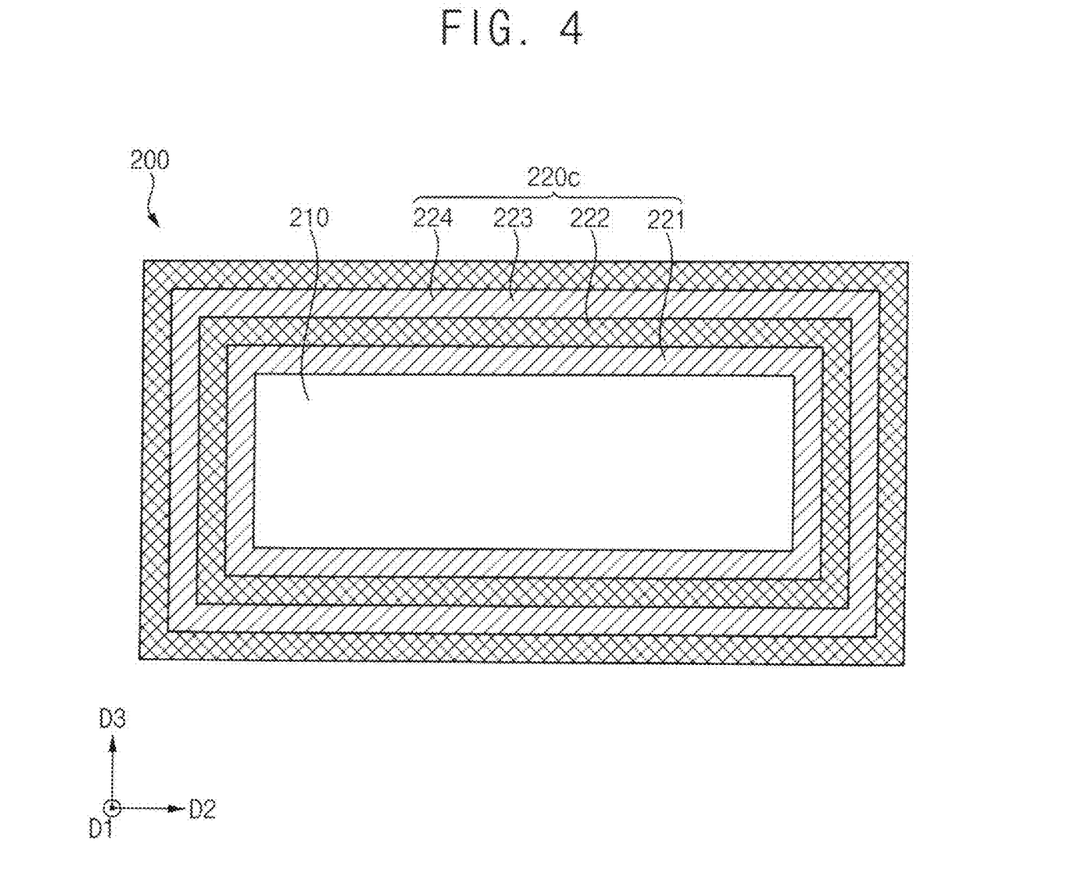
FIG. 4 is a cross-sectional view illustrating another embodiment of a glass article.

FIG. 3 is a cross-sectional view illustrating another embodiment of a glass article. FIG. 4 is a cross-sectional view illustrating a glass article.

Referring to FIGS. 3 and 4, the glass article 200 in another embodiment of the invention may include a central layer 210 and a surface layer 220b surrounding an entirety of the central layer 210. However, the glass article 200 described with reference to FIGS. 3 and 4 may be substantially the same as or similar to the glass article 200 described with reference to FIG. 2 except for the characteristics of the surface layers 220b and 220c. Hereinafter, overlapping descriptions will be omitted.

As described above, the glass article 200 may be a crystallized glass formed by crystallizing amorphous glass.

The central layer 210 may include a first crystalline phase having a first coefficient of thermal expansion. The surface layers 220b and 220c may include at least one first layer including a second crystalline phase having a second coefficient of thermal expansion smaller than the first coefficient of thermal expansion and at least one second layer including a third crystalline phase having a third coefficient of thermal expansion smaller than the first coefficient of thermal expansion.

The at least one first layer and the at least one second layer may be alternately disposed with each other. That is, the at least one first layer may be spaced apart from each other with the at least one second layer interposed therebetween, and the at least one second layer may be spaced apart from each other with the at least one first layer interposed therebetween.

In an embodiment, each of the lithium alumino silicate of the second crystalline phase and the lithium alumino silicate of the third crystalline phase may include $Li_2O$, $Al_2O_3$ and $SiO_2$ as constituent components. In another embodiment, each of the lithium alumino silicate in the second crystalline phase and the lithium alumino silicate in the third crystalline phase may include $Li_2O$, $Al_2O_3$, $SiO_2$ and $NaO_2$ as constituent components.

In an embodiment, a composition ratio of $Li_2O$, $Al_2O_3$, and $SiO_2$ of the lithium alumino silicate in the second crystalline phase may be different from a composition ratio of $Li_2O$, $Al_2O_3$ and $SiO_2$ in the lithium alumino silicate in the third crystalline phase.

In an embodiment, a content of $SiO_2$ in the lithium alumino silicate of the second crystal phase may be larger than a content of $SiO_2$ in the lithium alumino silicate in the third crystal phase, for example. In addition, a content of $NaO_2$ in the lithium alumino silicate of the second crystalline phase may be smaller than a content of $NaO_2$ of the lithium alumino silicate in the third crystalline phase. In this case, the second coefficient of thermal expansion of the second crystalline phase may be smaller than the third coefficient of thermal expansion of the third crystalline phase.

In an embodiment, the content of $SiO_2$ in the lithium alumino silicate of the second crystalline phase may be smaller than the content of $SiO_2$ in the lithium alumino silicate in the third crystalline phase, for example. In addition, a content of $NaO_2$ in the lithium alumino silicate of the second crystal phase may be larger than a content of $NaO_2$ in the lithium alumino silicate in the third crystal phase. In this case, the second coefficient of thermal expansion of the second crystalline phase may be larger than the third coefficient of thermal expansion of the third crystalline phase.

That is, by varying the composition ratio of each component of the lithium alumino silicate of the second crystalline phase and the composition ratio of each component of the lithium alumino silicate of the third crystalline phase, the coefficients of thermal expansion of the second crystalline phase and the third crystalline phase may be different.

A volume fraction of the second crystalline phase in the first layer may be different from a volume fraction of the third crystalline phase in the second layer.

In an embodiment, the volume fraction of the second crystalline phase in the first layer may be larger than the volume fraction of the third crystalline phase in the second layer. In this case, the second coefficient of thermal expansion of the second crystalline phase may be smaller than the third coefficient of thermal expansion of the third crystalline phase.

In another embodiment, the volume fraction of the second crystalline phase in the first layer may be smaller than the volume fraction of the third crystalline phase in the second layer. In this case, the second coefficient of thermal expansion of the second crystalline phase may be larger than the third coefficient of thermal expansion of the third crystalline phase.

That is, by varying the volume fraction of the second crystalline phase and the volume fraction of the third crystalline phase, the coefficients of thermal expansion of the second crystalline phase and the third crystalline phase may be different.

In an embodiment, referring to FIG. 3, in an embodiment, the at least one first layer may include a first surface layer 221 and a third surface layer 223 each including the second crystalline phase having the second coefficient of thermal expansion, for example. The at least one second layer may include a second surface layer 222 including the third crystalline phase having the third coefficient of thermal expansion. That is, the surface layer 220b may include the first, second, and third surface layers 221, 222, and 223.

The first surface layer 221 may surround an entirety of the central layer 210, the second surface layer 222 may surround an entirety of the first surface layer 221, and the third surface layer 223 may surround an entirety of the second surface layer 222. That is, the first surface layer 221 may be disposed adjacent to the central layer 210, and the third surface layer 223 may be farthest apart from the central layer 210.

As described above, when the surface layer 220b includes three layers, the second coefficient of thermal expansion may be smaller than the third coefficient of thermal expansion.

In order to make the second coefficient of thermal expansion smaller than the third coefficient of thermal expansion, the volume fraction of the second crystalline phase may be larger than the volume fraction of the third crystalline phase. In an alternative embodiment, in order to make the second coefficient of thermal expansion smaller than the third coefficient of thermal expansion, the content of $SiO_2$ in the lithium alumino silicate in the second crystalline phase may be larger than the content of $SiO_2$ in the lithium alumino silicate in the third crystalline phase.

In an embodiment, referring to FIG. 4, in an embodiment, the at least one first layer includes a first surface layer 221 and a third surface layer 223 each including the second crystalline phase having the second coefficient of thermal expansion, for example. The at least one second layer may include a second surface layer 222 and a fourth surface layer 224 each including the third crystalline phase having the third coefficient of thermal expansion. That is, the surface layer 220c may include the first, second, third, and fourth surface layers 221, 222, 223 and 224.

The first surface layer 221 may surround an entirety of the central layer 210, the second surface layer 222 may surround an entirety of the first surface layer 221, the third surface layer 223 may surround the second surface layer 222, and the fourth surface layer 224 may surround an entirety of the third surface layer 223. That is, the first surface layer 221 may be disposed adjacent to the central layer 210, and the fourth surface layer 224 may be farthest apart from the central layer 210.

As described above, when the surface layer 220c includes four layers, the second coefficient of thermal expansion may be larger than the third coefficient of thermal expansion.

In order to make the second coefficient of thermal expansion larger than the third coefficient of thermal expansion, the volume fraction of the second crystalline phase may be smaller than the volume fraction of the third crystalline phase. In an alternative embodiment, in order to make the second coefficient of thermal expansion larger than the third coefficient of thermal expansion, the content of $SiO_2$ in the lithium alumino silicate in the second crystalline phase may be smaller than the content of $SiO_2$ in the lithium alumino silicate in the third crystalline phase.

However, unlike shown in FIGS. 3 and 4, the surface layer 220b and 220c may include two layers or five or more layers.

Figure 5:
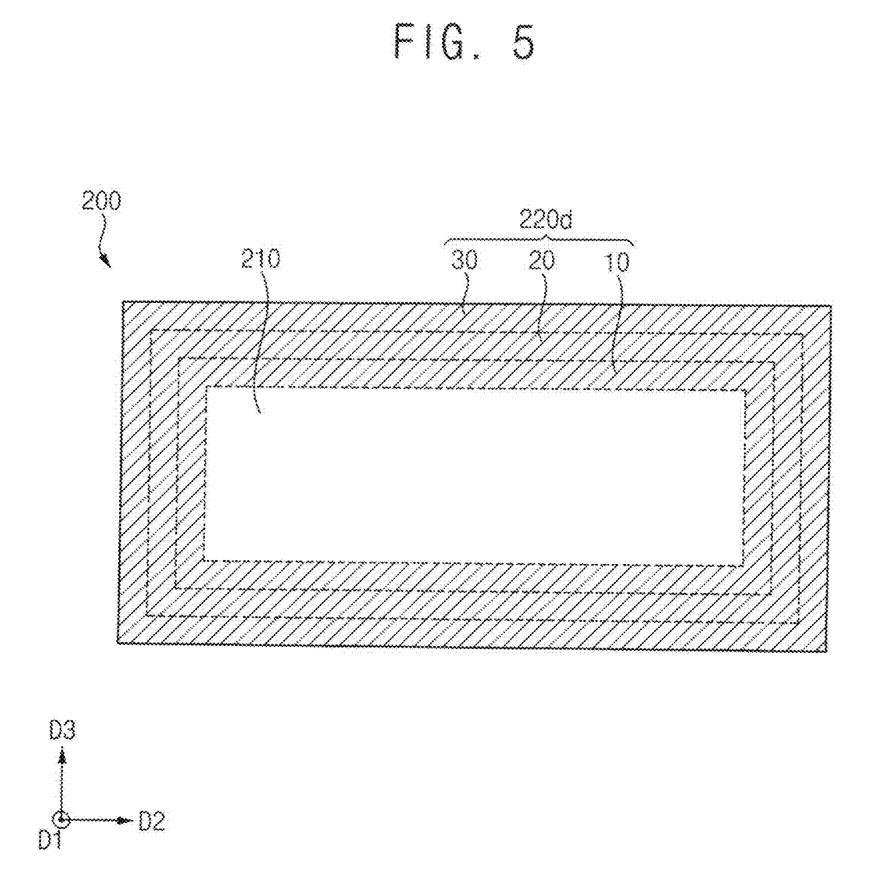
FIG. 5 is a cross-sectional view illustrating another embodiment of a glass article.

FIG. 5 is a cross-sectional view illustrating another embodiment of a glass article.

Referring to FIG. 5, the glass article 200 in another embodiment of the invention may include a central layer 210 and a surface layer 220d surrounding an entirety of the central layer 210. However, the glass article 200 described with reference to FIG. 5 may be substantially the same as or similar to the glass article 200 described with reference to FIG. 2 except for the characteristics of the surface layer 220d. Hereinafter, overlapping descriptions will be omitted.

As described above, the glass article 200 may be a crystallized glass formed by crystallizing amorphous glass.

The central layer 210 may include a first crystalline phase having a first coefficient of thermal expansion, and the surface layer 220d may include a second crystalline phase having a second coefficient of thermal expansion smaller than the first coefficient of thermal expansion. In an embodiment, the first crystalline phase may include lithium disilicate, and the second crystalline phase may include lithium alumino silicate.

The second crystalline phase of the surface layer 220d may have the second coefficient of thermal expansion that varies with a measurement location of the surface layer 220d. In an embodiment, the first coefficient of thermal expansion may be constant, and the second coefficient of thermal expansion may gradually increase from an outer surface of the surface layer 220d toward an outer surface of the central layer 210. In this case, the volume fraction of the second crystalline phase of the surface layer 220d may gradually decrease in a direction from the outer surface of the surface layer 220d toward the outer surface of the central layer 210. That is, by adjusting the volume fraction of the second crystalline phase of the surface layer 220d according to the location of the surface layer 220d, the second coefficient of thermal expansion may gradually increase in the direction from the outer surface of the surface layer 220d to the outer surface of the central layer 210.

In an embodiment, the surface layer 220d may divided into a first area 10 adjacent to the central layer 210, a third area 30 adjacent to the outer surface of the surface layer 220d, and a second area 20 disposed between the first area 40 and the third area 30, for example. In this case, the volume fraction of the second crystalline phase may be the smallest in the first area 10, and the volume fraction of the second crystalline phase may be the largest in the third area 30. That is, in the first area 10, the second coefficient of thermal expansion of the second crystalline phase may be the largest, and in the third area 30, the second coefficient of thermal expansion of the second crystalline phase may be smallest.

Figure 6:
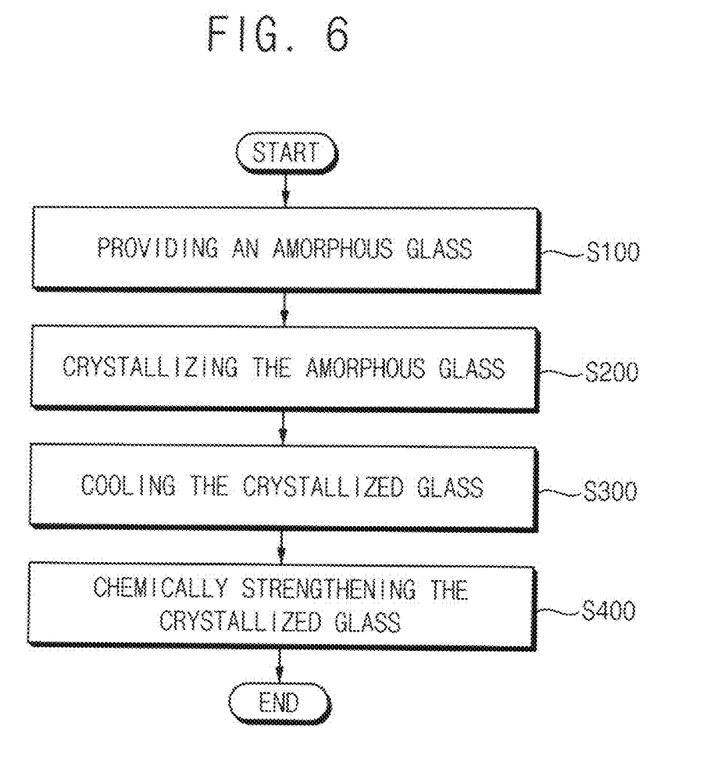
FIG. 6 is a flowchart illustrating a method of manufacturing the glass article of FIGS. 1 and 2.

FIG. 6 is a flowchart illustrating a method of manufacturing the glass article of FIGS. 1 and 2.

Referring to FIGS. 1, 2 and 6, the method of manufacturing the glass article 200 in an embodiment of the invention may include providing an amorphous glass (S100), crystallizing the amorphous glass (S200), cooling the crystallized glass formed by crystallizing the amorphous glass (S300) and chemically strengthening the crystallized glass (S400).

First, in an operation of providing the amorphous glass (S100), the amorphous glass may include LAS-based glass. In an embodiment, the amorphous glass may include $SiO_2$, $Al_2O_3$, and $Li_2O$. In this case, the amorphous glass essentially includes $Li_2O$, for example. In this case, the amorphous glass may further include $Na_2O$, $P_2O_5$, $K_2O$, $MgO$, $CaO$, $SrO$, $BaO$, $SnO_2$, $ZrO_2$, or the like. These may be used alone or in combination with each other.

In an operation of crystallizing the amorphous glass (S200), the amorphous glass may be crystallized through heat treatment or laser. In an embodiment, the amorphous glass may be crystallized through a heat treatment process. Accordingly, the amorphous glass may be crystallized to form a crystallized glass.

In an embodiment, the heat treatment process may be preferably performed by a heat treatment process which includes two operations in which the temperature is raised from room temperature to a first treatment temperature and maintained for a predetermined period of time, and then maintained at a second treatment temperature that is higher than the first treatment temperature for a predetermined period of time, for example. However, the heat treatment process is not limited thereto.

At this time, by controlling the heat treatment condition, a first crystalline phase having a first coefficient of thermal expansion may be formed inside the crystallized glass, and a second crystalline phase having a second coefficient of thermal expansion smaller than the first coefficient of thermal expansion may be formed on a surface of the crystallized glass. That is, by adjusting the heat treatment condition, the first coefficient of thermal expansion of the first crystalline phase formed inside the crystallized glass and the second coefficient of thermal expansion of the second crystalline phase formed on the surface of the crystallized glass may be different.

In an embodiment, the first crystalline phase may include lithium disilicate, and the second crystalline phase may include lithium alumino silicate. In an embodiment, in a temperature range of about 25° C. to about 600° C. or about 25° C. to about 700° C., a coefficient of thermal expansion of the lithium disilicate may be about $11 \times 10^{-6}/°$ C. and a coefficient of thermal expansion coefficient of the lithium alumino silicate may be about $0/°$ C. to about $2 \times 10^{-6}/°$ C., for example.

In an operation of cooling the crystallized glass (S300), the surface of the crystallized glass may be cooled. At this time, due to the difference between the first coefficient of thermal expansion of the first crystalline phase formed inside the crystallized glass and the second coefficient of thermal expansion of the second crystalline phase formed on the surface of the crystallized glass, the first crystalline phase formed inside the crystalized glass may be fixed and the second crystalline phase formed on the surface of the crystallized glass may be expanded. That is, the surface of the crystallized glass may be deepened by cooling the surface of the crystallized glass.

An operation of chemically strengthening the crystallized glass (S400) may be performed through an ion exchange process. The ion exchange process may be a process of exchanging ions inside the crystallized glass with other ions. Through the ion exchange process, ions on or near the surface of the crystallized glass may be replaced or exchanged with larger ions having the same valence or oxidation state. In an embodiment, when the crystallized glass includes a monovalent alkali metal such as Li+, Na+, k+, Rb+, monovalent cations on the surface of the crystallized glass may be exchanged with Na+, K+, Rb+, Cs+ ions having larger ionic radius, for example.

When the crystallized glass is exposed to Na ions in a method such as immersing the crystallized glass in a sodium nitrate ($NaNO_3$) melt bath, Li ions in the crystallized glass may be discharged to the outside and Na ions may be replaced in a place of Li ions. The exchanged Na ions may generate compressive stress because an ion radius is larger than an ion radius of the Li ions. As an amount of the exchanged Na ions increases, the compressive stress may increase. Since ion exchange is performed through the surface of the crystallized glass, the amount of Na ions may be the greatest on the surface of the crystallized glass. A portion of the exchanged Na ions may diffuse into the inside of the crystallized glass to increase a depth of a compression area, that is, a compression depth. However, the amount of the exchanged Na ions may be generally decreased as the distance from the surface of the crystallized glass increases. Accordingly, the surface of the crystallized glass may have the greatest compressive stress and may have a stress profile that decreases toward the inside. The flexibility and durability of the crystallized glass may be increased through the ion exchange process.

Accordingly, the glass article 200 shown in FIGS. 1 and 2 may be manufactured.

Embodiments of the invention may be applied to various display devices that include a display device. Embodiments of the invention may be applied to a high-resolution smartphone, a mobile phone, a smart pad, a smart watch, a tablet personal computer ("PC"), a vehicle navigation system, a television, a computer monitor, a notebook computer, or the like, for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of various embodiments and is not to be construed as limited to the predetermined embodiments disclosed, and that modifications to the disclosed embodiments, as well as other embodiments, are intended to be included within the scope of the appended claims.

What is claimed is:

1. A glass article comprising:
   a central layer including a first crystalline phase having a first coefficient of thermal expansion; and
   a surface layer surrounding an entirety of the central layer so that the surface layer is disposed on a first surface of the central layer and a second surface of the central layer perpendicular to the first surface of the central layer in a cross-section, the surface layer including:
   a second crystalline phase having a second coefficient of thermal expansion smaller than the first coefficient of thermal expansion.

2. The glass article of claim 1, wherein the first crystalline phase of the central layer includes lithium disilicate and the second crystalline phase of the surface layer includes lithium alumino silicate.

3. The glass article of claim 1, wherein a thickness of the surface layer is smaller than a thickness of the central layer in a thickness direction perpendicular to a main plane extension direction of the surface layer and the central layer.

4. The glass article of claim 1, wherein a volume fraction of the first crystalline phase of the central layer and a volume fraction of the second crystalline phase of the surface layer are equal to each other.

5. The glass article of claim 1, wherein the second crystalline phase has the second coefficient of thermal expansion which varies with a measurement location of the surface layer.

6. The glass article of claim 5, wherein the first coefficient of thermal expansion is constant, and
   wherein the second coefficient of thermal expansion gradually increases in a direction from an outer surface of the surface layer toward an outer surface of the central layer.

7. The glass article of claim 5, wherein a volume fraction of the second crystalline phase of the surface layer gradually decreases in a direction from an outer surface of the surface layer toward an outer surface of the central layer.

8. A glass article comprising:
   a central layer including a first crystalline phase having a first coefficient of thermal expansion; and
   a surface layer surrounding an entirety of the central layer so that the surface layer is disposed on a first surface of the central layer and a second surface of the central layer perpendicular to the first surface of the central layer in a cross-section, the surface layer including:

a first layer including a second crystalline phase having a second coefficient of thermal expansion smaller than the first coefficient of thermal expansion; and a second layer including a third crystalline phase having a third coefficient of thermal expansion smaller than the first coefficient of thermal expansion.

9. The glass article of claim 8, wherein the first crystalline phase includes lithium disilicate and each of the second and third crystalline phases includes lithium alumino silicate.

10. The glass article of claim 9, wherein a composition ratio of $Li_2O$, $Al_2O_3$, and $SiO_2$ of the lithium alumino silicate in the second crystalline phase is different from a composition ratio of $Li_2O$, $Al_2O_3$, and $SiO_2$ of the lithium alumino silicate in the third crystalline phase.

11. The glass article of claim 10, wherein the second coefficient of thermal expansion is different from the third coefficient of thermal expansion.

12. The glass article of claim 8, wherein a volume fraction of the first crystalline phase of the central layer and a volume fraction of the second crystalline phase of the surface layer are equal to each other.

13. The glass article of claim 8, wherein the first layer and the second layer are disposed alternately with each other.

14. The glass article of claim 8, wherein a volume fraction of the second crystalline phase in the first layer is larger than a volume fraction of the third crystalline phase in the second layer.

15. The glass article of claim 14, wherein the second coefficient of thermal expansion is smaller than the third coefficient of thermal expansion.

16. A display device comprising:
a display panel which displays an image; and
a glass article including:
a central layer including a first crystalline phase having a first coefficient of thermal expansion; and
a surface layer surrounding an entirety of the central layer so that the surface layer is disposed on a first surface of the central layer and a second surface of the central layer perpendicular to the first surface of the central layer in a cross-section, the surface layer including:
a second crystalline phase having a second coefficient of thermal expansion smaller than the first coefficient of thermal expansion.

17. The display device of claim 16, wherein the first crystalline phase of the central layer includes lithium disilicate and the second crystalline phase of the surface layer includes lithium alumino silicate.

18. The display device of claim 16, wherein a thickness of the surface layer is smaller than a thickness of the central layer.

19. The display device of claim 16, a volume fraction of the first crystalline phase of the central layer and a volume fraction of the second crystalline phase of the surface layer are equal to each other.

20. The display device of claim 16, wherein the second crystalline phase has the second coefficient of thermal expansion which varies with a measurement location of the surface layer.

* * * * *